(12) United States Patent
Fleury et al.

(10) Patent No.: US 7,733,409 B2
(45) Date of Patent: Jun. 8, 2010

(54) METHOD FOR DETECTING OBJECTS IN A DIGITAL IMAGE USING IMAGE ZONES OF DIFFERENT RESOLUTIONS

(75) Inventors: Benoist Fleury, Vincennes (FR); Joël Leleve, Epinay sur Seine (FR); Caroline Robert, Paris (FR)

(73) Assignee: Valeo Vision, Bobigny (FR)

( * ) Notice: Subject to any disclaimer, the term of this patent is extended or adjusted under 35 U.S.C. 154(b) by 1094 days.

(21) Appl. No.: 11/393,210

(22) Filed: Mar. 30, 2006

(65) Prior Publication Data

US 2006/0227214 A1    Oct. 12, 2006

(30) Foreign Application Priority Data

Apr. 11, 2005    (FR)    ................................... 05 03581

(51) Int. Cl.
 *H04N 5/225*    (2006.01)
(52) U.S. Cl. .................... 348/340; 348/148; 348/149
(58) Field of Classification Search ......... 348/148–149, 348/340
 See application file for complete search history.

(56) References Cited

U.S. PATENT DOCUMENTS

| 5,363,136 | A  | * | 11/1994 | Sztanko et al. | ......... 348/207.99 |
| 5,600,486 | A  | * | 2/1997  | Gal et al. | ...................... 359/569 |
| 6,137,535 | A  | * | 10/2000 | Meyers | ........................ 348/340 |
| 6,211,911 | B1 | * | 4/2001  | Komiya et al. | ............. 348/218.1 |
| 7,292,266 | B2 | * | 11/2007 | Lee et al. | ...................... 348/188 |
| 7,391,446 | B2 | * | 6/2008  | Yoshida | ................. 348/240.99 |
| 2003/0132384 | A1 | * | 7/2003  | Sugiyama et al. | ............ 250/330 |
| 2004/0017491 | A1 | * | 1/2004  | Stavely | ...................... 348/240.2 |
| 2004/0135905 | A1 | * | 7/2004  | Suda | ....................... 348/231.99 |
| 2004/0223233 | A1 | * | 11/2004 | Horiuchi | ...................... 359/687 |
| 2005/0168829 | A1 | * | 8/2005  | Nurishi et al. | ............... 359/668 |
| 2007/0252074 | A1 | * | 11/2007 | Ng et al. | .................... 250/208.1 |

FOREIGN PATENT DOCUMENTS

| WO | WO 00/64146 | 10/2000 |
| WO | WO2004/029659 | 4/2004 |

OTHER PUBLICATIONS

"Artificial Apposition Compound Eye Fabricated by Micro-Optics Technology," Duparre et al, *Applied Optics*, Aug. 1, 2004, vol. 43, No. 22, pp. 4303-4310.
"A Wide Angle Vision Sensor with High Distortion Lens-Detection of Camera Location and Gaze Direction Based on Two-Parallel-Line Algorithm," Shimizu et al, 1996 IEEE, pp. 1600-1605.

* cited by examiner

*Primary Examiner*—Tuan Ho
*Assistant Examiner*—Kent Wang
(74) *Attorney, Agent, or Firm*—Jacox, Meckstroth & Jenkins (57) ABSTRACT

A method and system according to the invention comprises the means for or steps of: acquiring, by means of a digital image taking apparatus, a digital image with aberration of a scene, the digital image incorporating at least a first image zone and a second image zone, the first and second image zones having respectively at least a first resolution and at least a second resolution, the first and second resolutions being different, calculating a deployed digital image, by deployment of at least one zone of the digital image with aberration, applying an object detection algorithm in the deployed digital image, and supplying information on each object detected in the deployed digital image.

46 Claims, 4 Drawing Sheets

METHOD FOR DETECTING OBJECTS IN A DIGITAL IMAGE USING IMAGE ZONES OF DIFFERENT RESOLUTIONS

FIELD OF THE INVENTION

The invention concerns in general terms the field of motor vehicle driving assistance. More particularly, the invention concerns a method and device for detecting objects in a digital image of a road scene, such as for example pedestrians or road signs. The invention also concerns a digital apparatus for taking images, such as a camera, adapted to implementation of the above object detection method.

BACKGROUND OF THE INVENTION

Various motor vehicle driving assistance systems are known in the prior art, using one or more cameras or image sensors.

In these known systems, the cameras are generally dedicated to specific applications. In other words, one camera is necessary for each type of application, for example a first camera for taking images in the visible range and a second camera for taking images in the near infrared range.

In addition, the detection of an object in the distance, at the center of the image, and a nearby object at the edge of the field is rarely compatible with the use of a single camera.

This is because an object in the distance and at the center of the image represents only a few pixels compared with an object at the edge of the image and close to the camera lens.

A small field makes it possible to detect an object present in the distance and at the center of the image, but does not make it possible to detect an object close to the vehicle and slightly to the side. Conversely, a larger aperture angle makes it possible to detect an object on the edges, but does not make it possible to detect an object in the distance, since the object is then represented by a small number of pixels.

The available solutions recommend, in the above cases, the use of an expensive image sensor having a large number of pixels, or a zoom, to the detriment of the simultaneity of making the images available for various fields.

The current techniques do not facilitate the design of compact economical devices which are well adapted to the significant constraints of robustness and costs, generally imposed in the automotive field, and capable of supplying to driving assistance systems the information of various types required by the applications installed in these systems.

The present invention aims to remedy the drawbacks of the prior art disclosed above by providing a method and device of the above mentioned type which allow detection both distant and broad of the objects, and this with a single image sensor that can be produced at a moderate cost.

SUMMARY OF THE INVENTION

According to a first aspect, the present invention provides a method of detecting objects in a digital image comprising the steps of:
acquiring, by means of a digital image-taking apparatus, a digital image with aberration of a scene, the digital image incorporating at least a first image zone and a second image zone, the first and second image zones having respectively at least a first resolution and at least a second resolution, the first and second resolutions being different;
calculating a deployed digital image, by deployment of at least one zone of the digital image with aberration;
applying an object detection algorithm in the deployed digital image; and
supplying information on each object detected in the deployed digital image.

According to another particular characteristic of the method of the invention, the first image zone is a central zone of the digital image and the second image zone is an edge zone of the digital image, and the first resolution is chosen so as to be higher than the second resolution.

According to a particular embodiment, the image acquisition step is carried out by means of a digital image taking apparatus equipped with an anamorphic lens, the aberration introduced into the image is predetermined so as to obtain a first substantially constant angular resolution for a first sector of the optical field of the anamorphic lens corresponding to the first image zone and a second variable angular resolution for a second sector of the optical field of the anamorphic lens corresponding to the second image zone, the first angular resolution being higher than the second angular resolution.

Correspondingly, the invention also concerns a digital image-taking apparatus comprising an optical lens and an image sensor adapted to an implementation of the method as briefly described above.

According to a particular characteristic, the image sensor comprises a plurality of pixels distributed over at least one central pixel zone having a first pitch between any two adjacent pixels in the central pixel zone and at least one edge pixel zone having a second pitch between any two adjacent pixels in the second edge pixel zone, the first and second pitches having different values, the first pitch being greater than the second pitch, and the central and edge pixel zones corresponding respectively to the first and second image zones.

According to another particular characteristic, the value of the first pitch is variable according to the adjacent pixels in question in the central pixel zone. In addition, the value of the second pitch can also be variable according to the adjacent pixels in question in the edge pixel zone.

According to another particular embodiment, the lens is of the anamorphic type and comprises a plurality of microlenses associated respectively with a plurality of pixels of the image sensor and having, between any two adjacent microlenses, a pitch of given value less than the pitch of the pixels.

According to another particular embodiment, the anamorphic lens comprises at least one toric lens.

According to yet another particular embodiment, the apparatus according to the invention comprises an optical lens and an image sensor wherein the lens is of the anamorphic type and comprises a plurality of microlenses distributed in first and second types to which the first and second focal distances respectively correspond, the microlenses being associated respectively with a plurality of pixels of the image sensor.

According to a particular characteristic of the above embodiment, the microlenses and pixels are disposed according to different constant pitches, the pitch of the pixels being less than the pitch of the microlenses.

According to another particular characteristic, the microlenses of the first type are situated in at least one central zone of the anamorphic lens and the microlenses of the second type are situated in at least one edge zone of the anamorphic lens.

According to yet another particular characteristic, the digital image taking apparatus according to the invention also comprises an infrared filter disposed at the level of the image plane or an intermediate image plane of the apparatus.

Preferably, the infrared filter comprises at least two zones in which distinct filterings are provided, a first zone corresponding to the top part of the image and in which the infrared rays undergo substantially no filtering and a second zone corresponding to the bottom part of the image and in which the infrared rays are substantially entirely filtered.

In addition, the infrared filter can be designed so as to provide a filtering of the infrared rays which increases-progressively from top to bottom of the digital image.

According to the applications of the invention, the image sensor can be of the CCD or CMOS type.

Correspondingly, the invention also concerns a device for detecting objects in a digital image, adapted to be installed in a motor vehicle. The device comprises a digital image-taking apparatus and a processing unit which are suitable for implementation of the method of the invention as briefly described above.

According to another particular characteristic, the device according to the invention also comprises a display screen and the processing unit comprises means able to correct the digital image in order to produce a corrected digital image reproducing the scene seen by the digital image-taking apparatus, the corrected digital image being intended for display on the screen.

Preferably, the device also comprises means for supplying information on each object detected.

The invention also concerns an information storage means, and a computer program whose execution allows implementation of the method according to the invention.

Other aspects and advantages of the present invention will emerge more clearly from a reading of the description of particular embodiments and designs which follow, this description being given by way of non-limiting example and made with reference to the accompanying drawings, in which:

DESCRIPTION OF THE PREFERRED EMBODIMENTS

Figure 1:
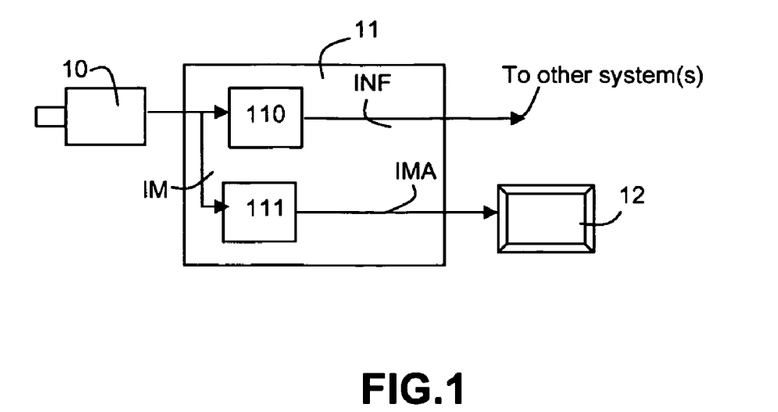
FIG. 1 shows the general structure of a preferred embodiment of the object detection device according to the invention.

With reference to FIG. 1, a particular embodiment of the object detection device according to the invention comprises essentially a camera 10, a processor unit 11 in which image processing software modules 110 and 111 are installed, and a display screen 12.

In accordance with the invention, the camera 10 is able to supply images IM comprising a given aberration. To this end, the camera 10 can be provided with an anamorphic lens.

The aberration introduced into the images IM by the camera 10 is intended to allow a detection of close and distant objects present in the scene seen by the camera 10, from images IM supplied by the camera 10.

Typically, the aberration introduced is calculated by a person skilled in the art when the optical lens of the camera 10 is designed, according in particular to the envisaged application of the invention.

One example of the effect of an optical lens determined so as to introduce an aberration as required by the invention is now described with reference to FIG. 2 and FIGS. 3A and 3B.

Figure 2:
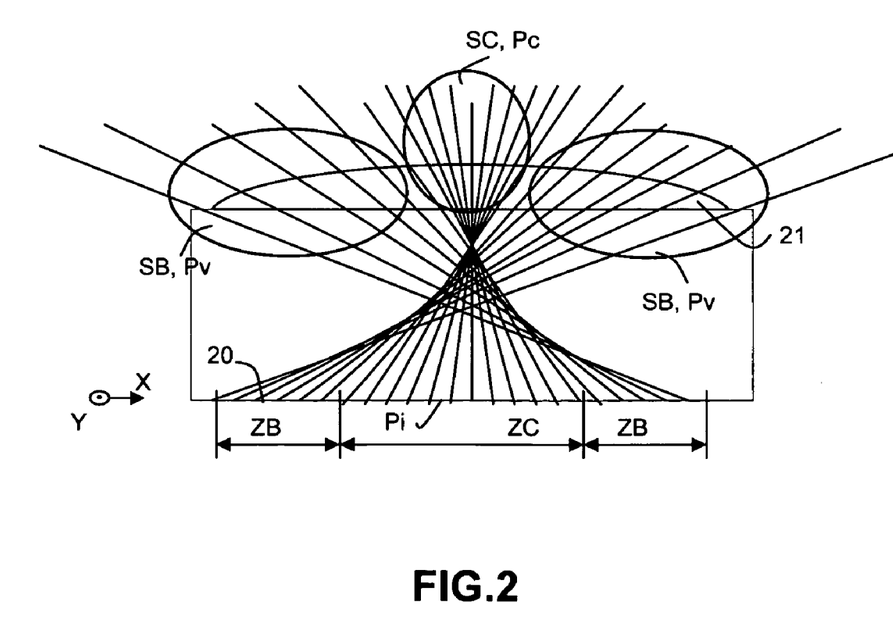
FIG. 2 is a theoretical diagram showing an example of the distribution of angular resolutions in digital image-taking apparatus according to the invention.
Figure 3A:
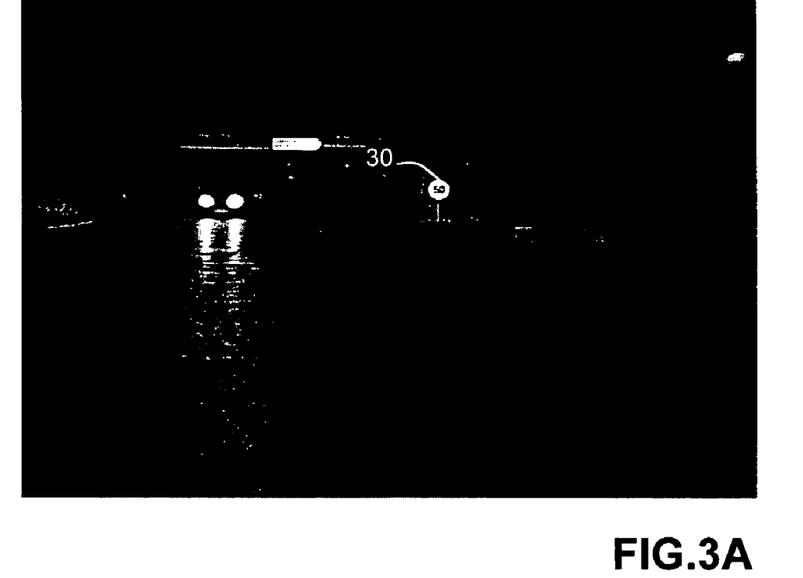
FIGS. 3A and 3B show respectively an example of a scene and an image with corresponding aberration as obtained in accordance with the invention.
Figure 3B:
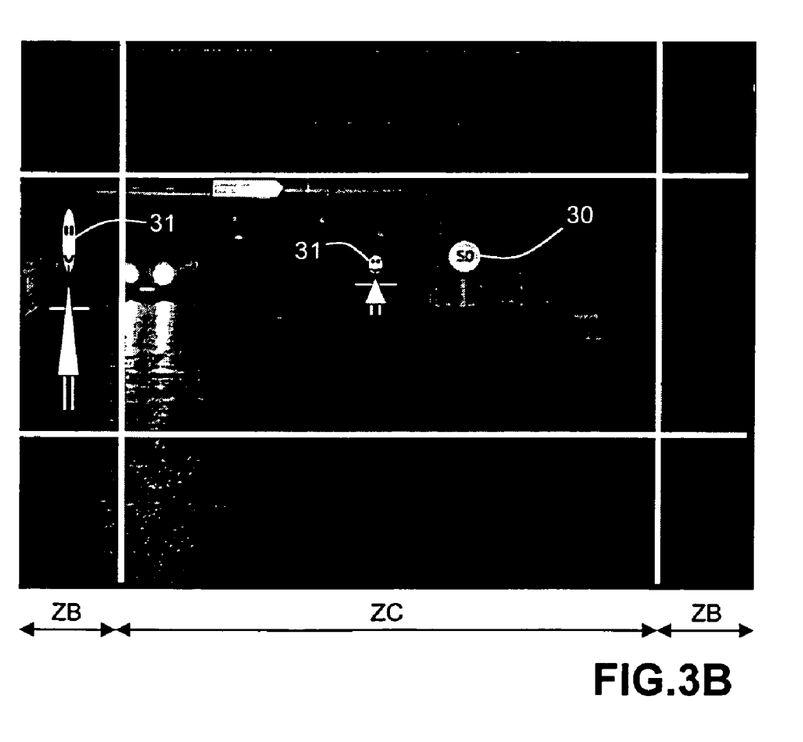

In order to simplify the description of the invention, the aberration is here considered in a single dimension, namely along the X axis in FIG. 2 and along the horizontal axis in FIG. 3B.

With reference to FIG. 2, the reference 20 corresponds to the image sensor, for example of the CCD or CMOS type, and the reference 21 to an anamorphic lens.

The image sensor 20 comprises in a conventional manner a matrix composed of pixels Pi whose pitch is depicted in FIG. 2 as having a given constant value.

The anamorphic lens 21 is shown here in the form of a single lens. It should be noted however that the anamorphic lens 21 can also, in accordance with the invention, be produced in the form of a plurality of microlenses obtained by the use of micro-optic techniques, as described below with reference to FIGS. 6A, 6B and 6C.

In the embodiment in FIG. 2, the anamorphic lens 21 comprises a lens of the toric type. Naturally, in other embodiments, the anamorphic lens 21 can comprise several toric lenses. Such a toric lens makes it possible to introduce a variable angular resolution in the image IM and causes an effect of compression of the edges of the image IM.

As is clear in FIG. 2, the field of the camera 10 is divided into angular sectors SC and SB.

The angular sector SC at the center of the field has an angular pitch Pc for a pixel zone ZC. The pitch Pc is here approximated as being substantially constant.

The angular sectors SB on the edges of the field have an angular pitch Pv for pixel zones ZB which increases from the central zone of the field towards the edges thereof.

Naturally, with this type of anamorphic lens 21 with a toric lens, there is strictly speaking no discontinuity or step in the variation in the angle of pitch, but a continuous transition from the angular pitch Pc towards the angular pitch Pv and vice versa.

The aberration introduced by the anamorphic lens 21 has the effect of favoring, in terms of number of pixels Pi, the central angular sector SC compared with the edge angular sectors SB. In other words, for the angular sector SC, the ratio of the angular opening of the sector to the number of pixel Pi in the corresponding pixel zone is greater than that obtained for the angular sectors SB.

An example of the effect introduced on the image IM by the anamorphic lens 21 is shown in FIG. 3B, for a scene seen by the camera 10, which is that shown in FIG. 3A.

The image of FIG. 3A is that which would normally be reproduced by the camera 10 if the latter were equipped with a spherical lens.

As shown in FIG. 3B the pixel zone ZC of the image IM does not comprise any aberration and keeps correct proportions for the objects present in the zone. In addition, the high number of pixels Pi in the pixel zone ZC allows sufficient resolution for the detection of distant objects. The good legibility of the signalling panel 30 in the image IM of FIG. 3B, compared with the image in FIG. 3A, will in particular be remarked.

The nature of the aberration introduced in the pixel zone ZB is shown in a simplified manner in FIG. 3B by the deformation of the person 31. In this example, the person 31 undergoes a compression deformation along the horizontal axis. It should be noted here that the aberration introduced in the pixel zone ZB by the anamorphic lens 21 must be determined when the anamorphic lens 21 is calculated so that it does not prevent correct detection of the objects in the pixel zone ZB.

Figure 4:
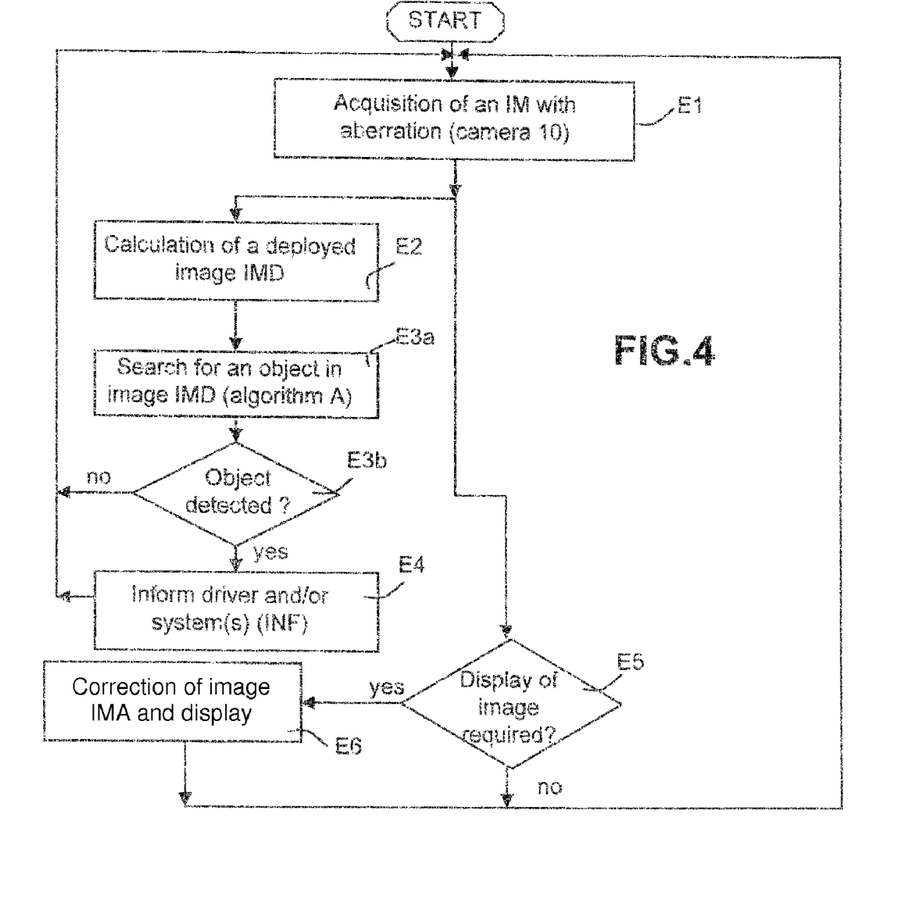
FIG. 4 is an algorithm showing various steps of the object detection method according to the invention.

With reference now more particularly to FIGS. 1 and 4, the camera 10 delivers the images IM to software modules 110 and 111 of the processor unit 11.

The software module 110 fulfils the function of detection of objects in the image IM.

The software module 111 fulfils an image correction function which is necessary in particular when a display on the display screen 12 of the scene seen by the camera 10 is required.

FIG. 4 shows processing steps E1 to E6 carried out by the processor unit 11.

At step E1, the camera 10 produces an image IM which corresponds to a scene seen by it. The image IM, which comprises an aberration by compression introduced by the anamorphic lens 21 of the camera 10, is supplied to the software modules 110 and 111.

At step E2, a deployed image IMD is calculated from the image IM with aberration. The operation performed at step E2 makes it possible to obtain an deployed image IMD in which the objects present have normal proportions, that is to say those that they have in reality. The deployment of the compressed image zones carried out at step E2 on the image IM makes it possible to obtain a deployed image IMD in which the aberration appears as being eliminated to a major extent.

This calculation step E2 has the advantage, for the supply of the deployed image IMD, of then applying only a single object search algorithm A for detecting objects determined in this deployed image IMD, such as road signs or obstacles.

During step E3a, algorithm A is executed, which searches for given objects in the whole of the deployed image IMD.

At the conditional step E3b, when an object sought is detected in the deployed image IMD by the algorithm A, detection information INF on the objects detected are supplied as an output by the software module 110.

It should be noted that, in this particular embodiment, steps E2, E3a, E3b and E4 are implemented in the module 110.

At step E4 the detection information INF is for example converted into audible and/or visual information intended for the driver of the motor vehicle in which the device of the invention is installed. In other applications of the invention, the detection information INF is transmitted to one or more other systems equipping the vehicle, such as for example a driving system or systems controlling functions of the vehicle.

At step E5, when a display of the scene is required, a step E6 is executed, which corresponds to the image correction processing for display effected by the software module 111. The module 111 supplies corrected images IMA in which the aberration present in the images IM is eliminated. The corrected images IMA are displayed on the display screen 12. In a variant, it is the deployed images IMD calculated by the module 110 rather than the images IM, as shown in FIG. 1, which are supplied to the module 111 in order to produce the corrected images IMA.

Figure 5:
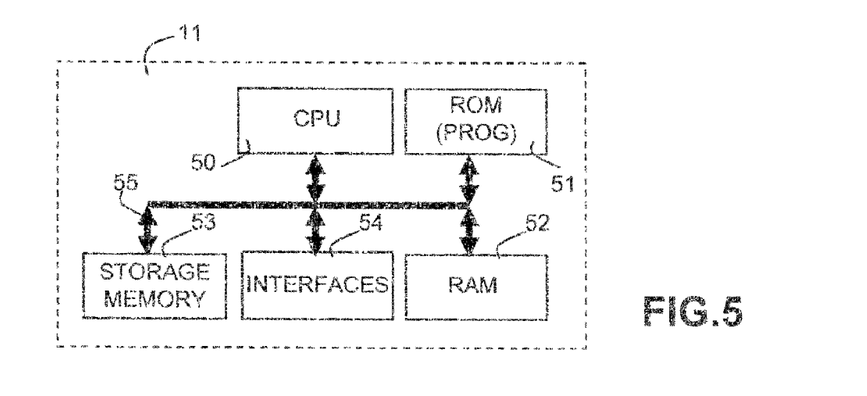
FIG. 5 shows a hardware configuration of a processor unit included in an object detection device according to the invention.

As shown in FIG. 5, the processor unit 11 has a conventional architecture and comprises a central processing unit CPU 50 such as a microprocessor, a read-only memory ROM or EEPROM 51, a random-access memory RAM 52, a storage memory 53, for example of the FLASH type, interfaces 54 and an internal communication bus 55. In another embodiment of the invention, the processor unit 11 is also equipped with a man-machine communication means, such as a keypad, through which the driver can select various operating modes.

The processor unit 11 executes one or more programs PROG which enable the implementation of the method according to the invention.

In the configuration in FIG. 5, the executable code of the programs PROG is housed partly or wholly in the ROM 51.

The executable code of the programs PROG can also be loaded partly in the storage memory 53, via the interfaces 54, from, for example, a diskette introduced into a disk drive or through a communication link connected for example to a microcomputer used for configuring the processor unit 11.

Naturally, the diskette from which the programs PROG are loaded can be replaced by a compact disc CD-ROM or a memory card. In more general terms, any information storage means that can be read by a computer or microprocessor, integrated or not in the processor unit 11, possibly removable, is adapted to store the programs PROG in whole or in part.

The central processing unit 50 controls the execution of the instructions or portions of code for the programs PROG, the instructions being stored in the ROM 51 and/or the storage memory 53 and/or the other information storage means indicated above.

When the processor unit 11 is powered up, the programs PROG stored in a non-volatile memory, such as the ROM 51 or the storage memory 53, are transferred in part or in whole into the memory RAM 52, which will then contain the executable code transferred from the programs PROG as well as various registers for storing variables and parameters necessary for implementing the method according to the invention.

It should also be noted that the processor unit 11 can take the form of a programmed apparatus. This programmed apparatus then contains the executable code of the programs PROG in a fixed form in an application specific integrated circuit (ASIC).

Figure 6A:
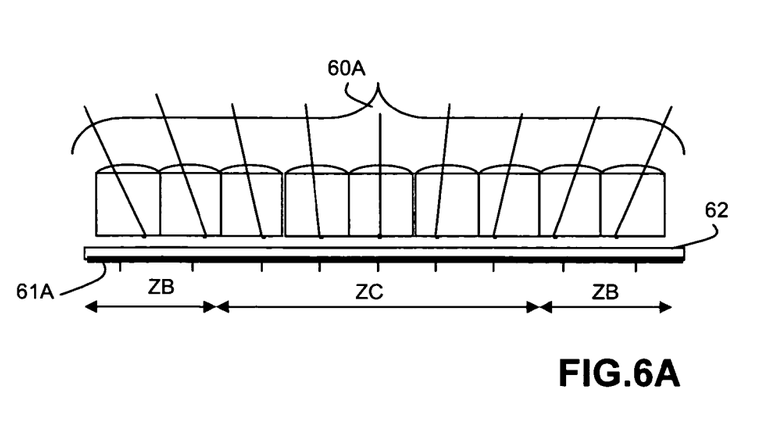
FIGS. 6A and 6B show first and second particular embodiments of a digital image-taking apparatus according to the invention.
Figure 6B:
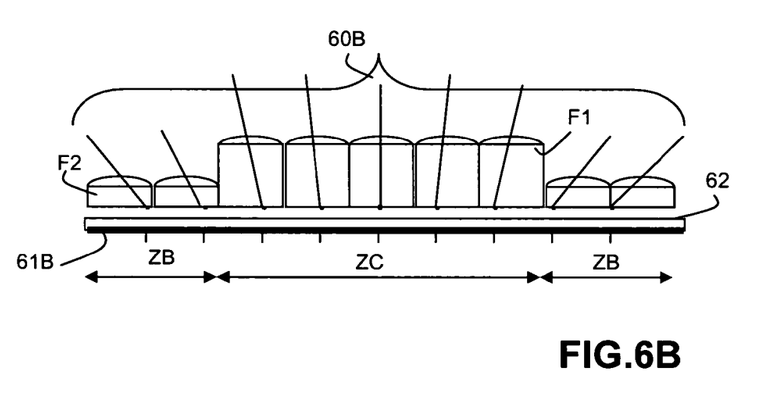

With reference essentially to FIGS. 6A and 6B, first and second particular embodiments of the camera 10 according to the invention are now described. These particular embodiments of the camera 10 are obtained by the use of micro-optic techniques.

In accordance with these particular embodiments, the camera 10 comprises in particular an optical lens formed by a plurality of microlenses and an image sensor of the CCD or CMOS type.

As shown in FIG. 6A, the first embodiment of the camera 10 comprises an optical lens 60A in the form of a plurality of microlenses substantially identical and having the same focal distance.

A lens of this type is described in the article "Artificial apposition compound eye fabricated by micro-optics technology" by Jacques Duparré, Peter Dannberg, Peter Schreiber, Andreas Bâuer and Andreas Tunnermann, published in Applied Optics, Vol 43, No 22, 1 Aug. 2004.

In the above article by J Duparré et al., the microlenses of the lens are arranged at a constant pitch and are associated with pixels of an image sensor which are arranged also according to a constant pitch. The pitch of the pixels is less than the pitch of the microlenses so that a pixel in question sees an angle of field that is greater and greater as the pixel in question moves away from the axis of the lens. However, an angular limitation in terms of aperture is imposed by the introduction of opaque walls between the microlenses. These opaque walls are intended to prevent the appearance of phantom images. The angular resolution obtained in the embodiment described in this article is constant.

In the embodiment in FIG. 6A, the camera 10 according to the invention is differentiated from the design in the article by J Duparré et al in particular by the fact that a break in the pitch of the pixels of the image sensor 61A is introduced.

Thus, in the pixel zone ZC, the pitch of the pixels has a first value. In the pixel zone ZB, the pitch of the pixels has a second value higher than the first value. In accordance with the invention, different angular resolutions are therefore provided for the pixel zone ZC and the pixel zone ZB.

As shown in FIG. 6B, the second embodiment of the camera 10 according to the invention comprises an optical lens 60B formed from a plurality of microlenses distributed in two different types and an image sensor 61B.

The microlenses of the optical lens 60B and the pixels of the image sensor 61B have different constant pitches. The constant pitch of the pixel is less than the constant pitch of the microlenses.

A first type of microlens contains the lenses of the pixel zone ZC which all have the same focal distance F1. A second type of microlens contains the lenses in the pixel zone ZB which all have the same focal distance F2 less than focal distance F1. This break in the focal distance of the microlenses allows the introduction, in accordance with the invention, of different angular resolutions for the pixel zone ZC and the pixel zone ZB.

Because of the constant pitch of the pixels of the image sensor 61B, it is possible, in this second embodiment, to use a standard image sensor, which has an advantage with regard to cost.

It should be noted here that the optical lens 60B and the image sensor 61B must be designed, that is to say the constant pitches of the microlenses and pixels must be chosen, so as to avoid reaching an angular limitation for the pixels in the central zone of the image.

Figure 6C:
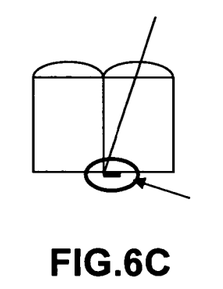
FIG. 6C shows a case of angular limitation to be prevented in a digital image-taking apparatus according to the invention.

As shown by way of illustration in FIG. 6C, this angular limitation occurs for a pixel Pi when the latter is situated in a transition zone between two adjacent microlenses.

In the embodiments of the camera 10 described above with reference to FIGS. 6A and 6B, the variation in the resolution in the image was essentially described as comprising steps or levels corresponding to the pixel zones ZC and ZB, following on from a variation of the same type in the pitch of the pixels or the microlenses. It should be noted here that the invention is not limited under any circumstances to this type of variation. This is because, in some applications, the lens and/or image sensor of the camera can be designed so as to introduce into the image a continuous variation in the resolution, for example by a variation corresponding to the pitch of the pixels or microlenses. A large number of different resolution values can then be present in the image.

As shown also in FIGS. 6A and 6B, the camera 10 according to the invention can be equipped with an infrared (IR) filter 62.

Figure 7:
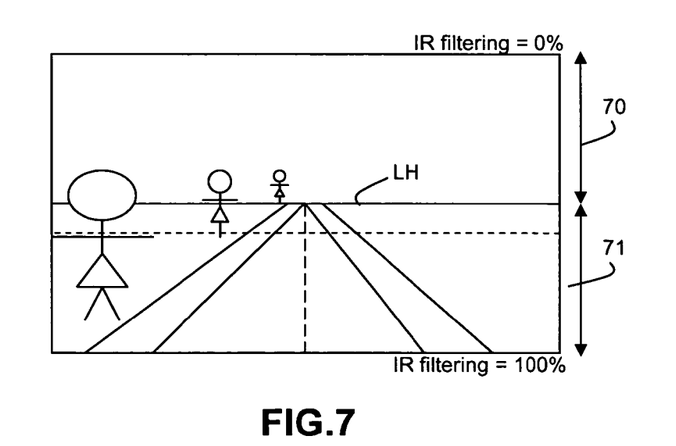
FIG. 7 shows, in a simplified form, an example of infrared filtering introduced in a particular embodiment of the digital image-taking apparatus according to the invention.

As shown in FIG. 7, the IR filter 62 is designed so as to procure a different IR filtering according to the zone of the image. This distinct IR filtering characteristic according to the zone of the image allows the use of the camera 10 both for applications functioning with wavelengths in the visible range and for applications functioning with wavelengths in the near infrared range.

Preferably, the IR filter 62 is placed on the image plane or on an intermediate image plane so as not to scramble the image produced by the camera 10.

FIG. 7 shows by way of example an IR filter 62 divided into two distinct zones 70 and 71.

The zone 70 is situated in the top half of the image and does not have IR filtering. This is because, in this zone 70, the IR information present is not dazzling by day for the camera 10 and does not require being filtered. The IR information therefore remains present in this zone 70 and can be used at night, for example for a night vision application.

The zone 71 is situated in the bottom half of the image and has IR filtering. In this zone 71, there exists a risk of dazzling of the camera 10 by the IR information present. This risk is eliminated by the IR filtering provided in this zone 71. The elimination of the IR information in the zone 71 is not detrimental at night because the zone 71 is illuminated by the vehicle headlights and does not require to be covered by an IR image.

Obviously, other embodiments are possible for the IR filter 62, these depending essentially on the applications of the invention. Thus the IR filter 62 can take the form of a filter varying progressively from a zone opaque to IR rays to a zone transparent to IR rays, for example with a 100% filtering at the bottom of the image and a 0% filtering at the top of the image. It should be noted that the variation in the IR filtering is not necessarily linear.

The zone 71 is situated in the bottom half of the image and has IR filtering. In this zone 71, there exists a risk of dazzling of the camera 10 by the IR information present. This risk is eliminated by the IR filtering provided in this IR zone 71. The elimination of the IR information in the zone 71 is not detrimental at night because the zone 71 is illuminated by the vehicle headlights and does not require to be covered by an IR image.

Obviously, other embodiments are possible for the IR filter 62, these depending essentially on the applications of the invention. Thus the IR filter 62 can take the form of a filter varying progressively from a zone opaque to IR rays to a zone transparent to IR rays, for example with a 100% filtering at the bottom of the image and a 0% filtering at the top of the image. It should be noted that the variation in the IR filtering is not necessarily linear.

What is claimed is:

1. A digital image-taking apparatus comprising an optical lens and an image sensor adapted to an implementation of a method of detecting objects in a digital image comprising the steps of:
   acquiring, by means of a digital image-taking apparatus, a digital image with aberration of a scene, said digital image incorporating at least a first image zone and a second image zone, the first and second image zones having respectively at least a first resolution and at least a second resolution, said first and second resolutions being different;
   calculating a deployed digital image, by deployment of at least one zone of said digital image with aberration;
   applying an object detection algorithm in said deployed digital image; and
   supplying information on each object detected in said deployed digital image;
   wherein said image sensor comprises a plurality of pixels distributed over at least one central pixel zone having a first pitch between any two adjacent pixels in said central pixel zone and at least one edge pixel zone having a second pitch between any two adjacent pixels in said second edge pixel zone, said first and second pitches having different values, said first pitch being greater than the said second pitch, and said central and edge pixel zones corresponding respectively to said first and second image zones;

wherein said digital image-taking apparatus comprises an infrared filter disposed at the level of an image plane or an intermediate image plane of said digital image-taking apparatus;

wherein said infrared filter comprises at least two zones in which distinct filterings are provided, a first zone corresponding to the top part of the image, and in which the infrared rays undergo substantially no filtering and a second zone corresponding to the bottom part of the image and in which the infrared rays are filtered substantially in their entirety.

2. The method according to claim 1, wherein said first image zone is a central zone of the said digital image and the said second image zone is an edge zone of the said digital image.

3. The method according to claim 1, wherein said image acquisition step is performed by means of a digital image-taking apparatus equipped with an anamorphic lens, and in that said aberration is predetermined so as to obtain a first substantially constant angular resolution for a first sector of the optical field of the said anamorphic lens corresponding to said first image zone and a second variable angular resolution for a second sector of the optical field of said anamorphic lens corresponding to said second image zone, said first angular resolution being higher than said second angular resolution.

4. A digital image-taking apparatus comprising an optical lens and an image sensor adapted to an implementation of the method according to claim 1, wherein said image sensor comprises a plurality of pixels distributed over at least one central pixel zone having a first pitch between any two adjacent pixels in said central pixel zone and at least one edge pixel zone having a second pitch between any two adjacent pixels in said second edge pixel zone, said first and second pitches having different values, said first pitch being greater than the said second pitch, and said central and edge pixel zones corresponding respectively to said first and second image zones.

5. The digital image-taking apparatus according to claim 4, wherein the value of the first pitch is variable according to the adjacent pixels in question in said central pixel zone.

6. The digital image-taking apparatus according to claim 4, wherein the value of the second pitch is variable according to the adjacent pixels in question in said edge pixel zone.

7. The digital image-taking apparatus according to claim 4, wherein said lens is of the anamorphic type and comprises a plurality of microlenses which are associated respectively with a plurality of pixels of said image sensor and having between any two adjacent microlenses a pitch with a predetermined value less than the pitch of said plurality of pixels.

8. The digital image-taking apparatus according to claim 4, which comprises an infrared filter disposed at the level of an image plane or an intermediate image plane of said digital image-taking apparatus.

9. The digital image-taking apparatus according to claim 4, wherein the image sensor is of the CCD or CMOS type.

10. The digital image-taking apparatus according to claim 4, wherein said lens is of the anamorphic type and comprises at least one toric lens.

11. The digital image-taking apparatus according to claim 10, which comprises an infrared filter disposed at an image plane or at an intermediate image plane of said digital image-taking apparatus.

12. The digital image-taking apparatus according to claim 10, wherein the image sensor is of the CCD or CMOS type.

13. The digital image-taking apparatus according to claim 4, wherein said lens is of the anamorphic type and comprises a plurality of microlenses distributed in first and second types to which there correspond respectively first and second focal distances, said plurality of microlenses being associated respectively with a plurality of pixels of said image sensor.

14. The digital image-taking apparatus according to claim 13, wherein said plurality of microlenses and said plurality of pixels are disposed at the different constant pitches, the pitch of the plurality of pixels being less than the pitch of the plurality of microlenses.

15. The digital image-taking apparatus according to claim 13, wherein the plurality of microlenses of the first type are situated in at least one central zone of said anamorphic lens and the plurality of microlenses of the second type are situated in at least one edge zone of said anamorphic lens.

16. The digital image-taking apparatus according to claim 13, which comprises an infrared filter disposed at the image plane or an intermediate image plane of said digital image-taking apparatus.

17. An information storage means, wherein it stores one or more programs whose execution allows an implementation of the method according to claim 1.

18. The information storage means according to claim 17, which comprises a volatile memory and/or a non-volatile memory and/or a hard disk and/or a diskette and/or a CD-ROM.

19. A computer program on an information storage means, comprising one or more sequences of instructions executable by a microprocessor and/or a computer, the execution of said sequences of instructions allowing an implementation of the method according to claim 1.

20. The digital image-taking apparatus as recited in claim 1 wherein said method further comprises the step of:
calculating a deployed digital image from said digital image with aberration.

21. The digital image-taking apparatus as recited in claim 1 wherein said method further comprises the step of:
applying an object detection algorithm to said deployed digital image to provide said information.

22. The digital image-taking apparatus as recited in claim 1 wherein said method comprises the step of:
using a digital image-taking apparatus comprising an anamorphic lens.

23. The digital image-taking apparatus as recited in claim 1 wherein said anamorphic lens is a toric lens.

24. The digital image-taking apparatus as recited in claim 1 wherein said first image zone is a central zone of said digital image.

25. The digital image-taking apparatus as recited in claim 24 wherein said second image zone is an edge zone of said digital image.

26. The digital image-taking apparatus as recited in claim 24 wherein said first image resolution is greater than said second image resolution.

27. The digital image-taking apparatus as recited in claim 22 wherein said method further comprises the step of:
predetermining said aberration of the scene so as to obtain a first angular resolution for a first sector of an optical field of said anamorphic lens corresponding to said first image zone and a second angular resolution for a second sector of said optical field of said anamorphic lens corresponding to said second image zone, said first angular resolution being substantially constant and said second angular resolution being variable.

28. The digital image-taking apparatus as recited in claim 27 wherein said first angular resolution is higher than said second angular resolution.

29. A digital image-taking apparatus comprising an optical lens and an image sensor adapted to an implementation of a method of detecting objects in a digital image comprising the steps of:
- acquiring, by means of a digital image-taking apparatus, a digital image with aberration of a scene, said digital image incorporating at least a first image zone and a second image zone, the first and second image zones having respectively at least a first resolution and at least a second resolution, said first and second resolutions being different;
- calculating a deployed digital image, by deployment of at least one zone of said digital image with aberration;
- applying an object detection algorithm in said deployed digital image; and
- supplying information on each object detected in said deployed digital image;
- wherein said image sensor comprises a plurality of pixels distributed over at least one central pixel zone having a first pitch between any two adjacent pixels in said central pixel zone and at least one edge pixel zone having a second pitch between any two adjacent pixels in said second edge pixel zone, said first and second pitches having different values, said first pitch being greater than the said second pitch, and said central and edge pixel zones corresponding respectively to said first and second image zones;
- wherein said digital image-taking apparatus comprises an infrared filter disposed at the level of an image plane or an intermediate image plane of said digital image-taking apparatus;
- wherein said infrared filter is able to provide filtering of the infrared rays which increases progressively from the top to the bottom of the digital image.

30. A digital image-taking apparatus comprising an optical lens and an image sensor adapted to an implementation of a method of detecting objects in a digital image comprising the steps of:
- acquiring, by means of a digital image-taking apparatus, a digital image with aberration of a scene, said digital image incorporating at least a first image zone and a second image zone, the first and second image zones having respectively at least a first resolution and at least a second resolution, said first and second resolutions being different;
- calculating a deployed digital image, by deployment of at least one zone of said digital image with aberration;
- applying an object detection algorithm in said deployed digital image; and
- supplying information on each object detected in said deployed digital image;
- wherein said image sensor comprises a plurality of pixels distributed over at least one central pixel zone having a first pitch between any two adjacent pixels in said central pixel zone and at least one edge pixel zone having a second pitch between any two adjacent pixels in said second edge pixel zone, said first and second pitches having different values, said first pitch being greater than the said second pitch, and said central and edge pixel zones corresponding respectively to said first and second image zones;
- wherein said lens is of the anamorphic type and comprises at least one toric lens;
- wherein said digital image-taking apparatus comprises an infrared filter disposed at an image plane or at an intermediate image plane of said digital image-taking apparatus;
- wherein said infrared filter comprises at least two zones in which distinct filterings are provided, a first zone corresponding to the top part of the image, and in which the infrared rays undergo substantially no filtering and a second zone corresponding to the bottom part of the image and in which the infrared rays are filtered substantially in their entirety.

31. A digital image-taking apparatus comprising an optical lens and an image sensor adapted to an implementation of a method of detecting objects in a digital image comprising the steps of:
- acquiring, by means of a digital image-taking apparatus, a digital image with aberration of a scene, said digital image incorporating at least a first image zone and a second image zone, the first and second image zones having respectively at least a first resolution and at least a second resolution, said first and second resolutions being different;
- calculating a deployed digital image, by deployment of at least one zone of said digital image with aberration;
- applying an object detection algorithm in said deployed digital image; and
- supplying information on each object detected in said deployed digital image;
- wherein said image sensor comprises a plurality of pixels distributed over at least one central pixel zone having a first pitch between any two adjacent pixels in said central pixel zone and at least one edge pixel zone having a second pitch between any two adjacent pixels in said second edge pixel zone, said first and second pitches having different values, said first pitch being greater than the said second pitch, and said central and edge pixel zones corresponding respectively to said first and second image zones;
- wherein said lens is of the anamorphic type and comprises at least one toric lens;
- wherein said digital image-taking apparatus comprises an infrared filter disposed at an image plane or at an intermediate image plane of said digital image-taking apparatus;
- wherein said infrared filter is able to provide filtering of the infrared rays which increases progressively from the top to the bottom of the digital image.

32. A digital image-taking apparatus comprising an optical lens and an image sensor adapted to an implementation of a method of detecting objects in a digital image comprising the steps of:
- acquiring, by means of a digital image-taking apparatus, a digital image with aberration of a scene, said digital image incorporating at least a first image zone and a second image zone, the first and second image zones having respectively at least a first resolution and at least a second resolution, said first and second resolutions being different;
- calculating a deployed digital image, by deployment of at least one zone of said digital image with aberration;
- applying an object detection algorithm in said deployed digital image; and
- supplying information on each object detected in said deployed digital image;
- wherein said image sensor comprises a plurality of pixels distributed over at least one central pixel zone having a first pitch between any two adjacent pixels in said central pixel zone and at least one edge pixel zone having a second pitch between any two adjacent pixels in said second edge pixel zone, said first and second pitches having different values, said first pitch being greater than the said second pitch, and said central and edge pixel zones corresponding respectively to said first and second image zones;

wherein said lens is of the anamorphic type and comprises a plurality of microlenses distributed in first and second types to which there correspond respectively first and second focal distances, said plurality of microlenses being associated respectively with a plurality of pixels of said image sensor;

wherein said digital image-taking apparatus comprises an infrared filter disposed at the image plane or an intermediate image plane of said digital image-taking apparatus;

wherein said infrared filter comprises at least two zones in which distinct filterings are provided, a first zone corresponding to the top part of the image, and in which the infrared rays undergo substantially no filtering and a second zone corresponding to the bottom part of the image and in which the infrared rays are filtered substantially in their entirety.

33. The digital image-taking apparatus according to claim 32, wherein the image sensor is of the CCD or CMOS type.

34. The device according to claim 32, which comprises a display screen and in that said processing unit also comprises means able to correct said digital image in order to produce a corrected digital image reproducing the scene seen by said digital image-taking apparatus, said corrected digital image being intended for display on said screen.

35. The device according to claim 32, which comprises means for supplying information on each object detected.

36. A digital image-taking apparatus comprising an optical lens and an image sensor adapted to an implementation of a method of detecting objects in a digital image comprising the steps of:
    acquiring, by means of a digital image-taking apparatus, a digital image with aberration of a scene, said digital image incorporating at least a first image zone and a second image zone, the first and second image zones having respectively at least a first resolution and at least a second resolution, said first and second resolutions being different;
    calculating a deployed digital image, by deployment of at least one zone of said digital image with aberration;
    applying an object detection algorithm in said deployed digital image; and
    supplying information on each object detected in said deployed digital image;
    wherein said image sensor comprises a plurality of pixels distributed over at least one central pixel zone having a first pitch between any two adjacent pixels in said central pixel zone and at least one edge pixel zone having a second pitch between any two adjacent pixels in said second edge pixel zone, said first and second pitches having different values, said first pitch being greater than the said second pitch, and said central and edge pixel zones corresponding respectively to said first and second image zones;
    wherein said lens is of the anamorphic type and comprises a plurality of microlenses distributed in first and second types to which there correspond respectively first and second focal distances, said plurality of microlenses being associated respectively with a plurality of pixels of said image sensor;
    wherein said digital image-taking apparatus comprises an infrared filter disposed at the image plane or an intermediate image plane of said digital image-taking apparatus;
    wherein the said infrared filter is able to provide filtering of the infrared rays which increases progressively from the top to the bottom of the digital image.

37. A vehicle image system for providing motor vehicle driving assistance, said vehicle image system comprising:
    a digital image-taking apparatus for acquiring a digital image with aberration of a scene, said digital image incorporating at least a first image zone having a first image resolution and a second image zone having a second image resolution; said first image resolution being different than said second image resolution;
    a processing unit for processing said digital image to supply information on at least one object in said digital image said processing unit introducing said aberration into said digital image so as to obtain a first substantially constant angular resolution for a first sector of the optical field of a lens corresponding to said first image zone and a second variable angular resolution for a second sector of the optical field of the lens corresponding to said second image zone, said first angular resolution being higher than said second angular resolution and obtaining said digital image, wherein each object detected in said first image zone has normal proportions with said aberration being substantially eliminated; and
    said processing unit calculating a deployed digital image, by deployment of at least one zone of said digital image with aberration, applying an object detection algorithm in said deployed digital image, supplying information on each object detected in said deployed digital image;
    using said information to assist driving the motor vehicle;
    said image sensor comprising a plurality of pixels distributed over at least one central pixel zone having a first pitch between any two adjacent pixels in said central pixel zone and at least one edge pixel zone having a second pitch between any two adjacent pixels in said second edge pixel zone, said first and second pitches having different values, said first pitch being greater than the said second pitch, and said central and edge pixel zones corresponding respectively to said first and second image zones;
    wherein said digital image-taking apparatus comprises an infrared filter disposed at the level of an image plane or an intermediate image plane of said digital image-taking apparatus;
    wherein said infrared filter comprises at least two zones in which distinct filterings are provided, a first zone corresponding to the top part of the image, and in which the infrared rays undergo substantially no filtering and a second zone corresponding to the bottom part of the image and in which the infrared rays are filtered substantially in their entirety.

38. The vehicle image system as recited in claim 37 wherein said processing unit comprises:
    means for calculating a deployed digital image from said digital image with aberration.

39. The vehicle image system as recited in claim 38 wherein said processing unit comprises:
    an object detection algorithm that is applied to said deployed digital image to provide said information.

40. The vehicle image system as recited in claim 37 wherein said digital image-taking apparatus comprises an anamorphic lens.

41. The vehicle image system as recited in claim 40 wherein said anamorphic lens is a toric lens.

42. The vehicle image system as recited in claim 37 wherein said first image zone is a central zone of said digital image.

43. The vehicle image system as recited in claim 42 wherein said second image zone is an edge zone of said digital image.

44. The vehicle image system as recited in claim 37 wherein said first image resolution is greater than said second image resolution.

45. The vehicle image system as recited in claim 40 wherein said vehicle image system further comprises:
means for predetermining said aberration of the scene so as to obtain a first angular resolution for a first sector of an optical field of said anamorphic lens corresponding to said first image zone and a second angular resolution for a second sector of said optical field of said anamorphic lens corresponding to said second image zone, said first angular resolution being substantially constant and said second angular resolution being variable.

46. The vehicle image system as recited in claim 45 wherein said first angular resolution is higher than said second angular resolution.

* * * * *